(12) United States Patent
Yoshitake et al.

(10) Patent No.: US 9,929,386 B2
(45) Date of Patent: Mar. 27, 2018

(54) BATTERY ASSEMBLY

(75) Inventors: Shinsuke Yoshitake, Kyoto (JP); Katsuhiko Okamoto, Kyoto (JP); Jun Nakamura, Kyoto (JP); Takeshi Sasaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 1441 days.

(21) Appl. No.: 13/318,328

(22) PCT Filed: May 13, 2010

(86) PCT No.: PCT/JP2010/058091
§ 371 (c)(1),
(2), (4) Date: Oct. 31, 2011

(87) PCT Pub. No.: WO2010/131700
PCT Pub. Date: Nov. 18, 2010

(65) Prior Publication Data
US 2012/0052359 A1    Mar. 1, 2012

(30) Foreign Application Priority Data
May 14, 2009  (JP) .................................. 2009-117674

(51) Int. Cl.
*H01M 2/10*     (2006.01)
*H01M 10/04*    (2006.01)
(Continued)

(52) U.S. Cl.
CPC ..... *H01M 2/1077* (2013.01); *H01M 10/0481* (2013.01); *H01M 10/486* (2013.01);
(Continued)

(58) Field of Classification Search
CPC ........................... Y02E 60/12; H01M 10/5004
See application file for complete search history.

(56) References Cited

U.S. PATENT DOCUMENTS 5,002,841 A    3/1991 Belongia et al.
5,766,801 A    6/1998 Inoue et al.
(Continued)

FOREIGN PATENT DOCUMENTS

CN    1281265 A      1/2001
CN    101212032 A    7/2008
(Continued)

OTHER PUBLICATIONS

International Search Report dated Aug. 17, 2010 in PCT/JP2010/058091 (English Translation Thereof).
European Search Report dated Sep. 25, 2013.

*Primary Examiner* — Ula C Ruddock
*Assistant Examiner* — Tony S Chuo
(74) *Attorney, Agent, or Firm* — McGinn IP Law Group, PLLC.

(57) ABSTRACT

There is provided a battery assembly wherein assembly can be facilitated by reducing the number of components to be assembled, by integrally fixing resin plates (52, 62) on the inside of metal plates (51, 61) of end plates (5, 6). A laminated battery body (3) is constituted by adjacently arranging battery holders (2) made of resin forming cooling passages (4) between a plurality of batteries (1) and holding such batteries (1) on both sides between other batteries (1). The metal plates (51, 61) and resin plates (52, 62) that are integrally fixed on the inside of these metal plates are provided on the outside of the batteries (1) at both ends of the laminated battery body (3). Thus, the batteries (1) are held by the resin plates (52, 62), and the end plates (5, 6) are respectively arranged to form the cooling passages (4) between these batteries (1) and the metal plates (51, 61). The laminated battery body (3) is fixed in a clamped manner by fixing means clamping these end plates (5, 6).

20 Claims, 6 Drawing Sheets

(51) Int. Cl.

| | | |
|---|---|---|
| *H01M 10/48* | (2006.01) | |
| *H01M 10/625* | (2014.01) | |
| *H01M 10/6563* | (2014.01) | |
| *H01M 10/647* | (2014.01) | |
| *H01M 10/6557* | (2014.01) | |
| *H01M 10/613* | (2014.01) | |
| *H01M 10/6562* | (2014.01) | |

(52) U.S. Cl.
CPC ....... *H01M 10/613* (2015.04); *H01M 10/625* (2015.04); *H01M 10/647* (2015.04); *H01M 10/6557* (2015.04); *H01M 10/6562* (2015.04); *H01M 10/6563* (2015.04)

(56) References Cited

U.S. PATENT DOCUMENTS

| | | | |
|---|---|---|---|
| 6,225,778 B1 | 5/2001 | Hayama et al. | |
| 8,071,234 B2 | 12/2011 | Okada et al. | |
| 2005/0208375 A1 | 9/2005 | Sakurai | |
| 2005/0212477 A1 | 9/2005 | Uchida et al. | |
| 2006/0204840 A1 | 9/2006 | Jeon et al. | |
| 2007/0026305 A1 | 2/2007 | Jeon et al. | |
| 2007/0037051 A1 | 2/2007 | Kim et al. | |
| 2007/0190409 A1* | 8/2007 | Sakurai .................... H01G 2/04 429/159 | |
| 2008/0160395 A1* | 7/2008 | Okada .................. B60L 3/0046 429/99 | |
| 2008/0280194 A1* | 11/2008 | Okada ................. H01M 2/1077 429/99 | |
| 2009/0155675 A1* | 6/2009 | Houchin-Miller .. H01M 2/1077 429/120 | |
| 2009/0246616 A1 | 10/2009 | Koyama et al. | |
| 2009/0255109 A1* | 10/2009 | Weber ..................... H01M 2/14 29/623.2 | |
| 2010/0136461 A1 | 6/2010 | Tsujiko et al. | |
| 2010/0167115 A1* | 7/2010 | Okada ................. H01M 2/1077 429/99 |
| 2010/0215999 A1* | 8/2010 | Yoon ....................... H01M 2/08 429/90 |
| 2011/0223462 A1 | 9/2011 | Kim et al. |
| 2012/0052359 A1 | 3/2012 | Yoshitake et al. |

FOREIGN PATENT DOCUMENTS

| | | |
|---|---|---|
| EP | 2 056 392 A1 | 5/2009 |
| JP | 09-120808 A | 5/1997 |
| JP | 2001-507856 A | 6/2001 |
| JP | 2001-236937 A | 8/2001 |
| JP | 3271494 B | 1/2002 |
| JP | 2002-245992 A | 8/2002 |
| JP | 2004-227788 A | 8/2004 |
| JP | 2004-349202 A | 12/2004 |
| JP | 2005-268004 A | 9/2005 |
| JP | 2005-285516 A | 10/2005 |
| JP | 2006-127938 A | 5/2006 |
| JP | 2006-253149 A | 9/2006 |
| JP | 2006-318703 A | 11/2006 |
| JP | 2007-042648 A | 2/2007 |
| JP | 2007-048750 A | 2/2007 |
| JP | 2007-115718 A | 5/2007 |
| JP | 2007-280858 A | 10/2007 |
| JP | 2008-016259 A | 1/2008 |
| JP | 2008-130374 A | 6/2008 |
| JP | 2008-166191 A | 7/2008 |
| JP | 2008-269985 A | 11/2008 |
| JP | 2008-277042 A | 11/2008 |
| JP | 2009-048965 A | 3/2009 |
| JP | 2009-231143 A | 10/2009 |
| JP | 2009-238643 A | 10/2009 |
| JP | 2010-086773 A | 4/2010 |
| JP | 5569521 B2 | 8/2014 |
| WO | WO 98/31059 | 7/1998 |
| WO | WO 2008/027343 A1 | 3/2008 |

* cited by examiner

BATTERY ASSEMBLY

TECHNICAL FIELD

The present invention relates to a battery assembly in which a plurality of batteries, arranged via battery holders, are fixed in a clamped manner from both sides by end plates.

BACKGROUND ART

In an electric vehicle or the like, a large-capacity storage battery is required, and therefore, a battery assembly in which a large number of batteries are arranged and fixed is used. Further, as such a battery assembly, there has been proposed a battery assembly in which a plurality of batteries, arranged via battery holders made of resin, are fixed in a clamped manner from both sides by end plates made of resin or metal (see Patent Document 1 and Patent Document 2, for example).

The respective batteries of the foregoing battery assembly are arranged in such a manner that lateral surfaces of rectangular box type metal battery cases, each having the largest area, are opposed to each other, and battery holders made of resin are each placed between the adjacent batteries, thereby providing a laminated battery body. Furthermore, the end plates are placed outwardly of the batteries at ends of the laminated battery body, and the laminated battery body is fixed in a clamped manner by these end plates, thereby providing the battery assembly.

The battery holders serve to provide insulation between the batteries located on both sides of each battery holder and to form ventilation cooling passages between lateral surfaces of these batteries, each having the largest area, so as to cool each battery. Moreover, the battery holders hold portions of the lateral surfaces of the batteries, each having the largest area, in a fitting manner; thus, the battery holders function to facilitate assembly of the laminated battery body, and also function to prevent positional deviation or disconnection of the batteries from the laminated battery body fixed in a clamped manner by the end plates.

In this case, the end plates serve to fix a plurality of massive batteries in a clamped manner so as to provide the battery assembly, and also serve to attach the battery assembly to an installation position or the like; hence, when the end plates are made of a low-strength material such as resin, the thicknesses thereof must be sufficiently increased, and the volume efficiency of the resulting battery assembly is reduced, so that the thicknesses are preferably reduced with the use of the end plates made of metal having high strength. For example, in Patent Document 2, since end plates made of resin are used as illustrated in FIGS. 1 to 4, the thicknesses thereof are significantly increased, and the resulting battery assembly will occupy an excessive installation space.

PRIOR ART REFERENCE

Patent Document

Patent Document 1: JP-A-2008-166191
Patent Document 2: JP-A-2008-130374
Patent Document 3: JP-A-2002-245992

SUMMARY OF THE INVENTION

Problems to be Solved by the Invention

When only metal plates are used as end plates, strength thereof is high, thus enabling an improvement in volume efficiency; however, in order to provide insulation, resin battery holders have to be placed between batteries located at ends and the end plates. Then, there arises the necessity to connect two types of components, i.e., the end plates and the resin battery holders, thus causing a problem that the number of components to be assembled in assembling a battery assembly is increased and work efficiency for assembly work is reduced.

Further, in the case of the battery assembly, depending on heat dissipation design, a ventilation passage is usually increased in length to make it difficult for cooling air to flow as the batteries are located closer to the ends, and a battery temperature is thus likely to increase. Furthermore, when the battery temperature is increased, a battery inner pressure is also increased, and in particular, deformation of lateral surfaces, each having the largest area, is increased. Accordingly, in the battery assembly, it is important to measure battery temperatures of the batteries located at ends and lateral surface deformation in order to control energization and cooling.

However, when the battery holders are placed between the end plates and the batteries located at ends in attaching, from the end plates, sensors for measuring temperatures of lateral surfaces of the batteries at the ends, having the largest areas, and/or for measuring lateral surface deformation resulting from inner pressure increase, there also occurs a problem that deformation of the battery holders occurs to obstruct battery state detection.

Moreover, there has also been proposed a battery assembly in which resin plates sufficiently smaller than lateral surfaces of batteries, having the largest areas, are bonded to the lateral surfaces instead of the foregoing resin battery holders (see Patent Document 3, for example). In such a battery assembly, when a plurality of batteries are arranged, cooling passages can be ensured around the resin plates placed between the batteries, and the number of components to be assembled in assembling the battery assembly is reduced.

However, in the foregoing battery assembly, the resin plates cannot hold the batteries, thus causing problems that a dedicated jig for aligning the batteries in assembling a laminated battery body is needed, and positional deviation or disconnection of the batteries from the laminated battery body fixed in a clamped manner by end plates cannot be prevented.

An object of the present invention to provide a battery assembly in which resin plates are integrally fixed to inner sides of metal plates of end plates, thus making it possible to reduce deflection of insulating parts of the end plates while reducing thicknesses of the end plates, and to reduce the number of components to be assembled so as to facilitate assembly.

Means for Solving the Problems

A battery assembly of the present invention includes: a plurality of batteries arranged in a given direction; a battery holder disposed between the respective batteries; a pair of end plates disposed on an outside of batteries, which are located at both ends of the plurality of batteries; and a clamp fixing member configured to fixes the plurality of batteries via the pair of end plates. At least one of the pair of end plates includes: a metal plate; and an insulating plate integrally fixed to an inner side of the metal plate.

It is preferable that a protrusion is formed on a surface of the insulating plate, and a tip portion of the protrusion is brought into contact with an end battery located at one end of the plurality of batteries so as to form a cooling passage.

It is preferable that a battery state detector configured to detect a state of the end battery is attached to the at least one of the pair of end plates.

It is preferable that a material of the battery holder has an insulating property, and the respective batteries include a battery case made of metal. It is preferable that the end battery is held by the battery holder and the insulating plate.

It is preferable that the respective batteries comprise a rectangular box type of battery case, and the respective batteries are arranged such that lateral surfaces of the battery cases of the batteries, each having the largest area, are opposed to each other. As the shape of each battery case, a quadrangular prism shape serving as a rectangular box as a whole, a cylindrical shape that forms a perfect circle, an ellipse or an oblong circle in cross section, or a shape similar thereto may be adopted.

It is preferable that the battery state detector is fitted into the protrusion, and the battery state detector is brought into contact with the end battery. It is preferable that a through hole is formed through the insulating plate, and the battery state detector is fitted into the through hole.

It is preferable that the metal plate and the insulating plate are integrally fixed to each other through bonding.

Effect of the Invention

In a battery assembly according to the present invention, insulating plates such as resin plates, for example, are integrally fixed to inner sides of metal plates of end plates; therefore, no resin battery holder has to be placed between the end plates and batteries at ends of a laminated battery body in order to provide insulation therebetween, and the number of components to be assembled in assembling the battery assembly is reduced.

In addition, since the insulating plates are integrally fixed to high-strength metal plates, plates each having a thickness smaller than that of a conventional battery holder are sufficiently used for the insulating plates, thus preventing the possibility that the volume efficiency of the battery assembly will be reduced by excessive thicknesses as in the case where the end plates are entirely made of resin.

Further, since the insulating plates are integrally fixed to the metal plates, the insulating plates are less likely to be distorted as another body by application of load thereto. Note that in the battery holders incorporated into the battery assembly, gaps are formed in advance in consideration of component tolerance. Due to the influence of the gaps, insulating parts of the end plates are distorted when the batteries are pressed and clamped between a pair of the end plates, and this distortion becomes pronounced when a plurality of the batteries are arranged in a row; however, in the present invention, occurrence of such distortion will be avoided. Such a phenomenon was found for the first time in the course of development of the present invention. Note that the gaps formed in consideration of component tolerance serve to smoothly carry out the step of fitting the batteries into the battery holders, and are created by making spacing between after-mentioned holding portions slightly longer than spacing between the batteries.

In the battery assembly according to the present invention, protrusions are formed at surfaces of the insulating plates, and tip portions of the protrusions are brought into contact with the batteries at the ends, thereby forming cooling passages; then, the cooling passages through which fluid is efficiently circulated are formed by spaces provided by abutment of the tip portions of the protrusions against the batteries. Note that cooling passages may also be formed by the battery holders in a similar manner. Such a structure is capable of implementing an efficient cooling structure while maintaining strength that withstands the clamed fixation. Note that as the shapes of the protrusions, ridged shapes or island shapes may be used.

In the battery assembly according to the present invention, a battery state detector for detecting a state of the battery at the end is attached to at least one of the pair of end plates; then, since the insulating plates such as resin plates, for example, are integrally fixed to the inner sides of the metal plates of the end plates, the resin plates and the metal plates are hardly distorted when the batteries are pressed and clamped, and the state of the battery may be detected with high accuracy for a long period of time.

Note that when the battery state detector is directly affixed to a surface of a battery case by using an adhesive, there occurs a problem that durability of the state detector is affected by swelling of the battery. This is a phenomenon that occurs when an adhesive layer cannot follow deformation of the surface of the battery case. The occurrence of this phenomenon becomes more pronounced as the deformation amount of the surface of the battery case is increased. Accordingly, when the battery state detector is attached to a lateral surface of the rectangular box type metal battery case, having the largest area, the deformation amount of this region will be greater than that of the other lateral surface; therefore, the durability is considerably reduced, thus making it difficult to detect the state with high accuracy.

Further, according to a conventional technology, when a battery state detector is attached to an end plate, it is difficult to maintain the state where the battery state detector is brought into contact with a battery surface, and distortion of an insulating part of the end plate adversely affects the accuracy of detection of a battery state. In particular, when a plurality of batteries are arranged in a row, a reduction in the accuracy becomes a serious problem. Such a phenomenon was found for the first time in the course of development of the present invention, and the foregoing problems were effectively solved by the above-described structure.

In the battery assembly according to the present invention, the batteries are held by the battery holders and the insulating plates, thus preventing positional deviation or disconnection of the batteries even when a special jig or the like is not prepared, and making it possible to easily assemble the battery assembly.

In the battery assembly according to the present invention, the battery state detector is fitted into the protrusion, thereby enabling firm fixation of the battery detector even when the battery is deformed.

In the battery assembly according to the present invention, the battery state detector is attached so as to be brought into contact with the battery, thereby enabling an improvement in the accuracy of battery state detection.

In the battery assembly according to the present invention, a through hole is formed in the insulating plate, and the battery state detector is fitted into the through hole, thereby preventing passage of cooling air, provided by the cooling structure, from being obstructed by wiring of the battery detector.

In the battery assembly according to the present invention, when the metal plate and the insulating plate are integrally fixed to each other through bonding, the metal plate and the insulating plate may be integrally fixed to each other in an easier manner.

In the battery assembly according to the present invention, since the metal plate is held by the insulating plate, positional deviation of the metal plate will not occur, thus facilitating assembly, and eliminating the need for a dedicated jig for preventing positional deviation. Since an external force is likely to be exerted on the insulating plate and the metal plate in an integrated manner, the insulating plate is less likely to be distorted as another body.

BEST MODE FOR CARRYING OUT THE INVENTION

Hereinafter, an embodiment of the present invention will be described with reference to FIGS. 1 to 7.

Figure 1:
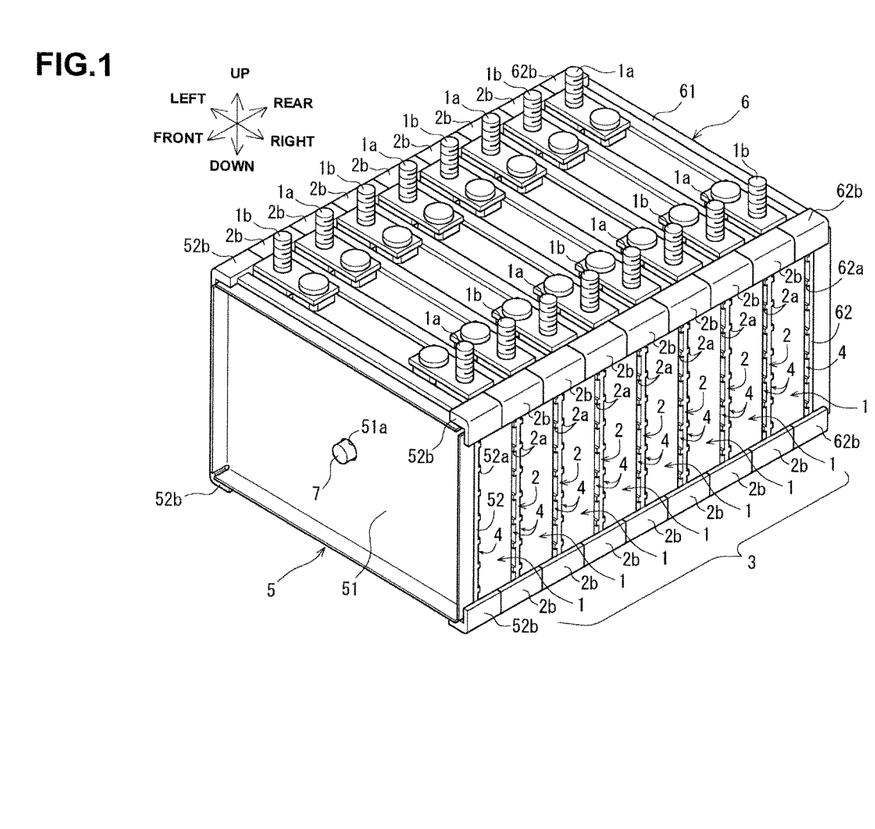
FIG. 1 is an overall perspective view illustrating a structure of a battery assembly according to one embodiment of the present invention.
Figure 2:
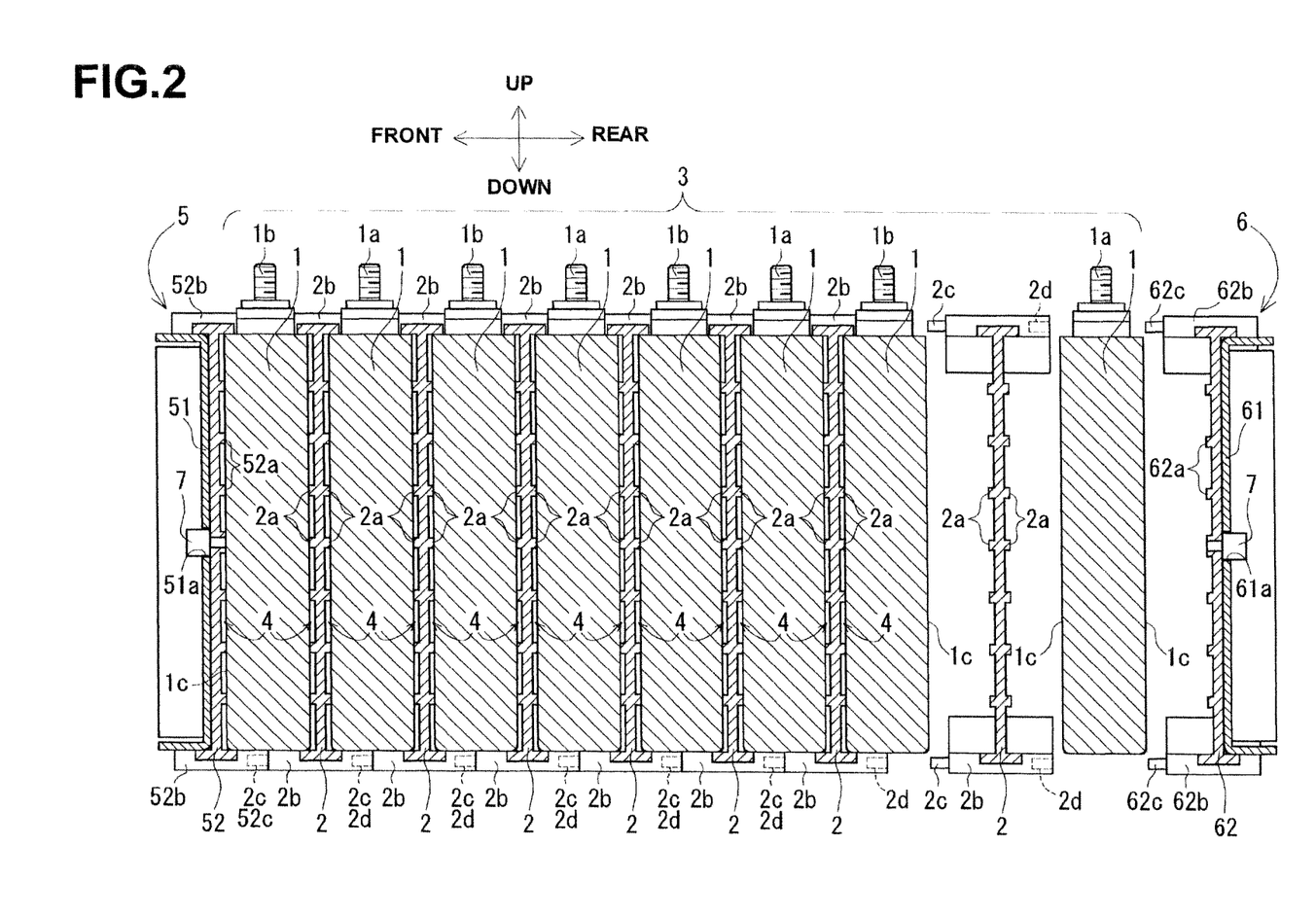
FIG. 2 is a longitudinal cross-sectional view illustrating the structure of the battery assembly according to one embodiment of the present invention.
Figure 3:
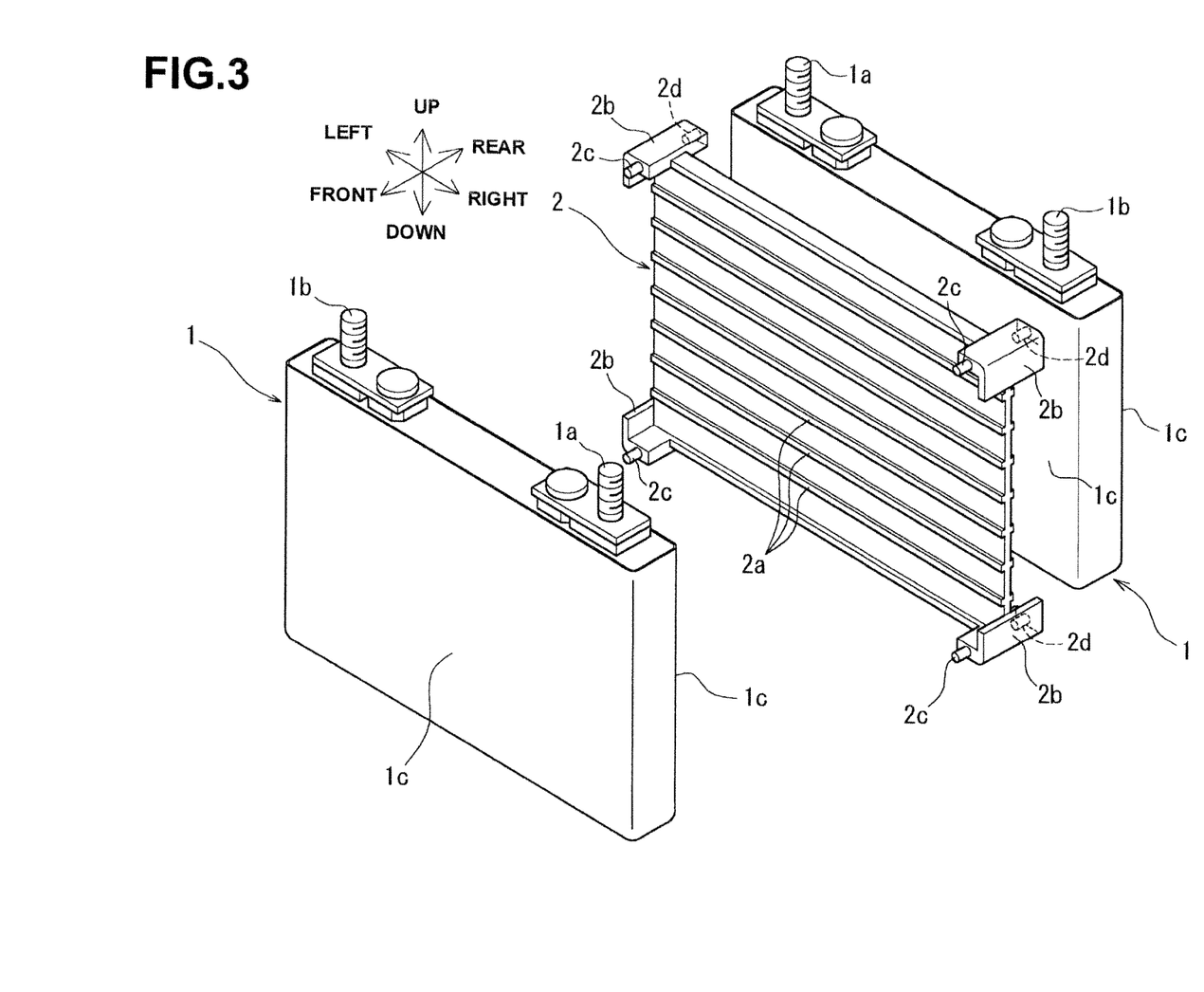
FIG. 3 is a perspective view illustrating a structure of a battery holder placed between batteries in one embodiment of the present invention.

As illustrated in FIGS. 1 and 2, in a battery assembly according to the present embodiment, eight batteries 1 each serving as a rectangular non-aqueous electrolyte secondary battery are arranged. As illustrated in FIG. 3, in each battery 1, an electricity-generating element and/or a non-aqueous electrolyte are/is contained in a rectangular box type metal battery case in which its longitudinal width is shorter than its vertical height or lateral length. Further, a positive terminal 1a and a negative terminal 1b are attached to lateral ends of a lid plate constituting an upper surface of the battery case.

Figure 4:
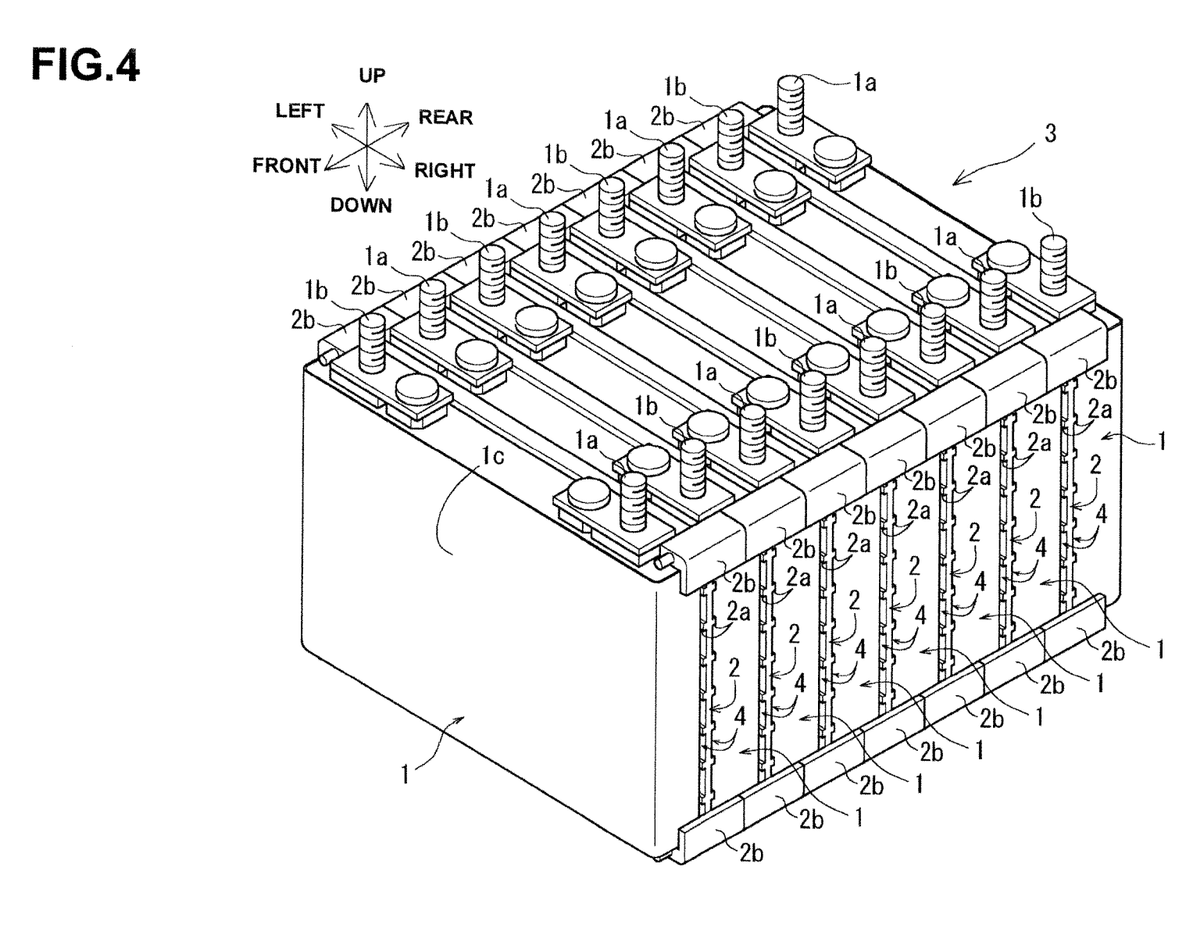
FIG. 4 is a perspective view illustrating a structure of a laminated battery body according to one embodiment of the present invention.

Since surfaces of the battery cases, which face in a longitudinal direction, serve as lateral surfaces 1c each having the largest area, the batteries 1 are arranged longitudinally in such a manner that the lateral surfaces 1c are opposed to each other and battery holders 2 made of resin are placed between the batteries 1, thereby forming a laminated battery body 3 illustrated in FIG. 4.

As illustrated in FIG. 3, in the battery holder 2, both surfaces of a rectangular resin plate material slightly larger than the lateral surface 1c of the battery 1 are provided with a large number of ridged protrusions 2a extended along a lateral direction, and holding portions 2b L-shaped in cross section are protruded from four corner portions of the plate material in the longitudinal direction so as to be sufficiently longer than the protruded length of each protrusion 2a.

Furthermore, the holding portions 2b are each provided with a pin 2c protruded forward from a front protrusion end face thereof, and a rear protrusion end face thereof is provided with a hole 2d into which the associated pin 2c is to be fitted. Note that only the holes 2d in the two right and left holding portions 2b at an upper end portion of the battery holder 2 are indicated by broken lines in FIG. 3, but the holes 2d are also similarly provided in the two right and left holding portions 2b at a lower end portion of the battery holder 2.

Accordingly, the battery holder 2 is placed between the batteries 1, 1 which are located on both sides of the battery holder 2 and longitudinally adjacent to each other, and the batteries 1, 1 are brought close to each other in the longitudinal direction; then, portions of the lateral surfaces 1c, 1c of both of the batteries 1, 1, opposed to each other, are fitted into the L-shaped holding portions 2b of the battery holder 2, which are located at the four corners thereof, so that the batteries 1, 1 are held by restriction of vertical and lateral movements thereof.

Moreover, since the lateral surfaces 1c, 1c, of the batteries 1, opposed to each other, abut against tip portions of the protrusions 2a of the battery holder 2, gaps are formed between the protrusions 2a and regions of surfaces of the plate material of the battery holder 2 where no protrusion 2a is formed, thus forming cooling passages 4 illustrated in FIGS. 1 and 2.

Besides, since the battery holders 2 are placed between the eight batteries 1 of the laminated battery body 3, the pins 2c at the front end faces of the holding portions 2b of the battery holders 2 are fitted into the holes 2d at the rear end faces of the holding portions 2b of the other longitudinally adjacent battery holders 2, thus allowing the seven battery holders 2 to be engaged with each other.

As illustrated in FIGS. 1 and 2, end plates 5 and 6 are placed outwardly of the batteries 1, 1 which are included in the eight batteries 1 constituting the laminated battery body 3 and are located at longitudinal ends thereof. In other words, the end plate 5 is placed forwardly of the battery 1 located at the front end, and the end plate 6 is placed rearwardly of the battery 1 located at the rear end.

Figure 5:
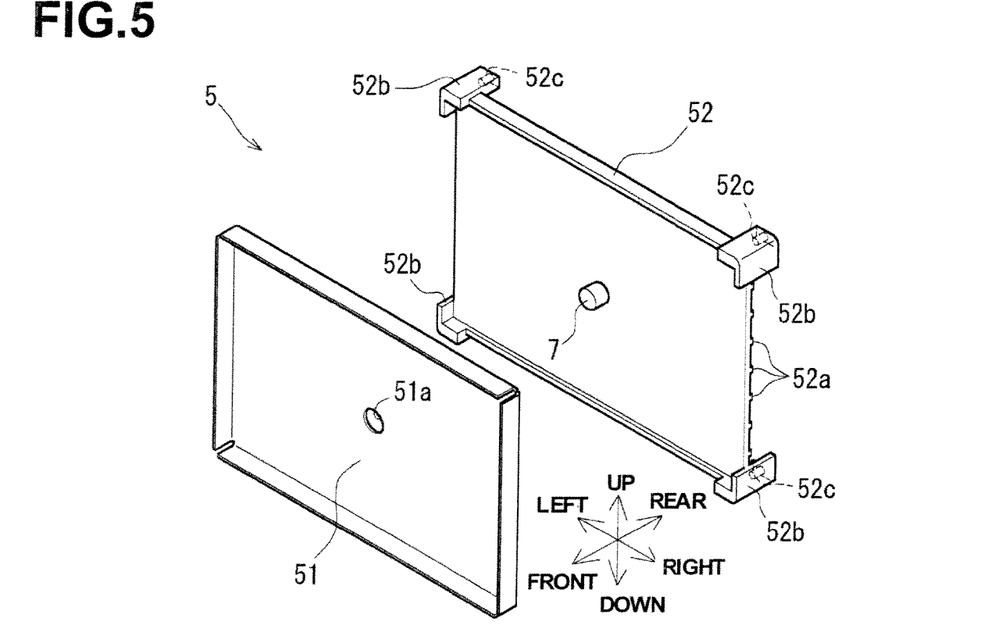
FIG. 5 is a perspective view illustrating a structure of a front end plate to be assembled in one embodiment of the present invention.

As illustrated in FIG. 5, the end plate 5 includes a metal plate 51 and a resin plate 52. The metal plate 51 is formed to have a size substantially similar to that of the lateral surface 1c of the battery 1 by folding four edge portions of a rectangular metal plate material forward. In the resin plate 52, a rearwardly-facing surface of a rectangular resin plate material slightly larger than the lateral surface 1c of the battery 1 is provided with a large number of ridged protrusions 52a extended along the lateral direction, and holding portions 52b L-shaped in cross section are protruded from four corner portions of the plate material in the longitudinal direction so as to be sufficiently longer than the protruded length of each protrusion 52a.

Further, the holding portions 52b are provided, at rear protrusion end faces thereof, with holes 52c into which the pins 2c of the holding portions 2b of the battery holder 2 are to be fitted. Accordingly, the resin plate 52 differs from the battery holder 2 in that no protrusion 52a is formed at a forwardly-facing surface of the resin plate material and no pin is protruded from a front protrusion end face of each holding portion 52b.

Figure 6:
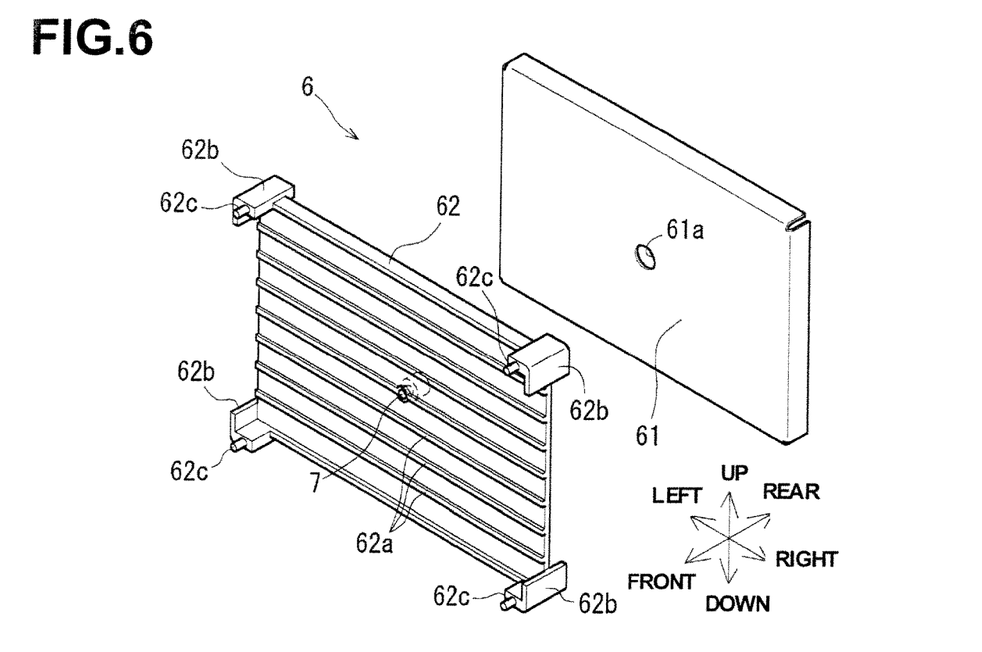
FIG. 6 is a perspective view illustrating a structure of a rear end plate to be assembled in one embodiment of the present invention.

As illustrated in FIG. 6, the end plate 6 includes a metal plate 61 and a resin plate 62. The metal plate 61 is formed to have a size substantially similar to that of the lateral surface 1c of the battery 1 by folding four edge portions of a rectangular metal plate material rearward.

In the resin plate 62, a forwardly-facing surface of a rectangular resin plate material slightly larger than the lateral surface 1c of the battery 1 is provided with a large number of ridged protrusions 62a extended along the lateral direction, and holding portions 62b L-shaped in cross section are protruded from four corner portions of the plate material in the longitudinal direction so as to be sufficiently longer than the protruded length of each protrusion 62a. Furthermore, the holding portions 62b are provided with pins 62c which are protruded forward from front protrusion end faces thereof and are to be fitted into the holes 2d of the holding portions 2b of the battery holder 2.

Accordingly, the metal plate 61 has a structure similar to one in which the metal plate 51 of the end plate 5 is reversed longitudinally. On the other hand, the resin plate 62 has a structure substantially similar to one in which the resin plate 52 of the end plate 5 is reversed longitudinally but no hole is provided in the rear protrusion end face of each holding portion 62b.

A temperature sensor 7 is embedded in a plate surface center portion of each of the resin plate 52 of the end plate 5 and the resin plate 62 of the end plate 6.

Specifically, in the resin plate 52, a main body of the temperature sensor 7 is placed at a center portion of its forwardly-facing surface, and a temperature-sensitive tip portion of the temperature sensor 7, which is protruded rearward from the main body, is passed through the resin plate 52 so as to be rearwardly exposed at a tip portion of the protrusion 52a; on the other hand, in the resin plate 62, a main body of the temperature sensor 7 is placed at a center portion of its rearwardly-facing surface, and a temperature-sensitive tip portion of the temperature sensor 7, which is protruded forward from the main body, is passed through the resin plate 62 so as to be forwardly exposed at a tip portion of the protrusion 62a.

Further, the metal plate 51 of the end plate 5 and the metal plate 61 of the end plate 6 are provided, at plate surface center portions thereof, with through holes 51a and 61a, respectively, into which the main bodies of the temperature sensors 7 may be fitted.

Figure 7:
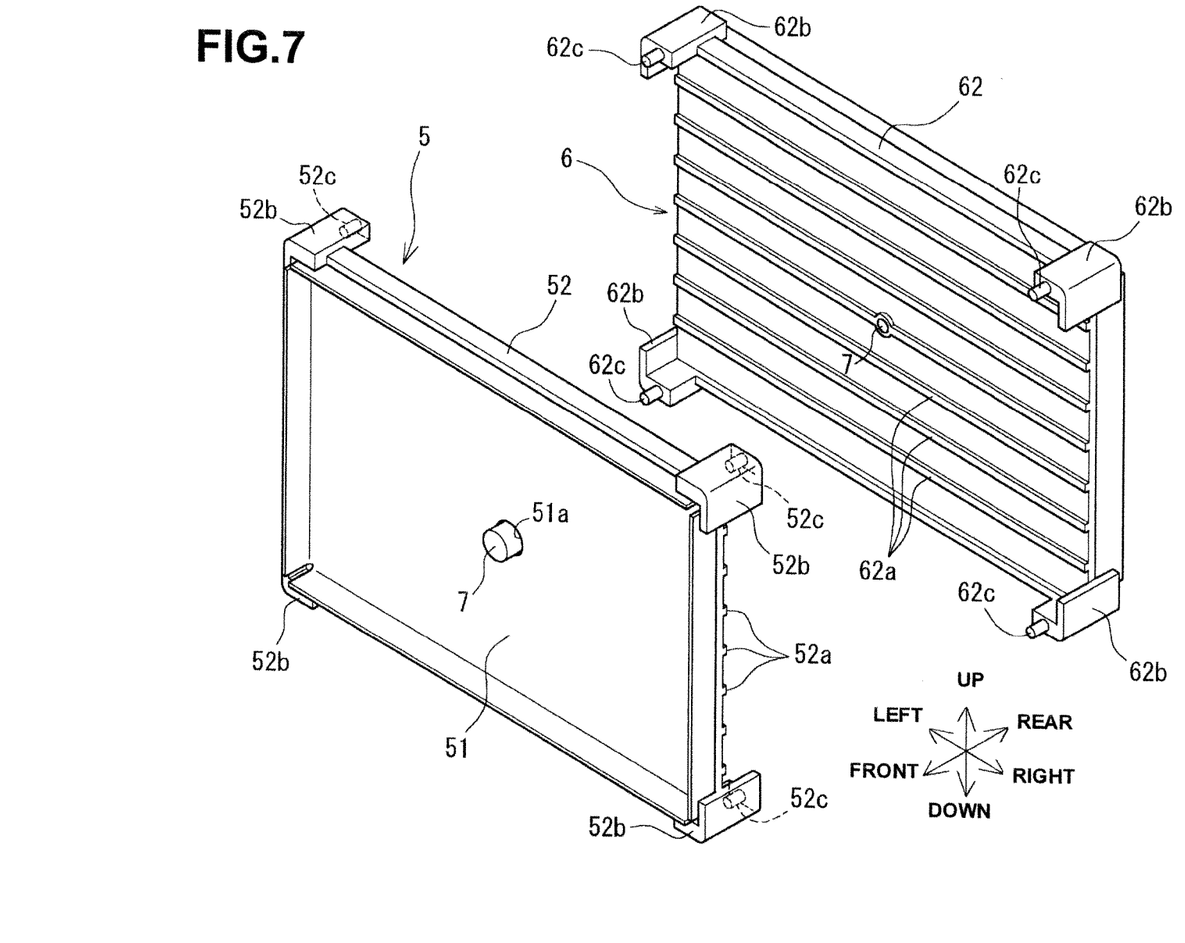
FIG. 7 is a perspective view illustrating the structures of the front and rear end plates according to one embodiment of the present invention.

As illustrated in FIG. 7, in the end plate 5, with the metal plate 51 fitted into the L-shaped holding portions 52b at the four corners of the resin plate 52 from the front, the rearwardly-facing surface (inner surface) of the metal plate 51 and the forwardly-facing surface of the resin plate 52 are integrally fixed to each other through bonding. On the other hand, in the end plate 6, with the metal plate 61 fitted into the L-shaped holding portions 62b at the four corners of the resin plate 62 from the rear, the forwardly-facing surface (inner surface) of the metal plate 61 and the rearwardly-facing surface of the resin plate 62 are integrally fixed to each other through bonding.

As illustrated in FIGS. 1 and 2, in the end plate 5, portions of the forwardly-facing lateral surface 1c of the battery 1 placed at the front end of the laminated battery body 3 are held by being fitted into the L-shaped holding portions 52b at the four corners of the resin plate 52 from the rear. In addition, the pins 2c of the holding portions 2b of the battery holder 2 placed at the front end of the laminated battery body 3 are fitted into and engaged with the holes 52c of the holding portions 52b.

Furthermore, in the end plate 6, portions of the rearwardly-facing lateral surface 1c of the battery 1 placed at the rear end of the laminated battery body 3 are held by being fitted into the L-shaped holding portions 62b at the four corners of the resin plate 62 from the front. In addition, the pins 62c of the holding portions 62b are fitted into and engaged with the holes 2d of the holding portions 2b of the battery holder 2 placed at the rear end of the laminated battery body 3.

Then, the tip portions of the protrusions 52a of the resin plate 52 and the tip portions of the protrusions 62a of the resin plate 62 abut against the outer lateral surfaces 1c, 1c of the batteries 1, 1 at the ends of the laminated battery body 3, and therefore, gaps are formed between these protrusions and regions of plate material surfaces of the resin plates 52 and 62 where the protrusions 52a and 62a are not formed, thus forming the cooling passages 4 similar to the ones formed between the batteries 1 of the laminated battery body 3 and the battery holders 2.

Moreover, the tip portions of the temperature sensors 7, 7 embedded in the resin plates 52 and 62 are exposed at the tip portions of the protrusions 52a and 62a and are thus abutted against the outer lateral surfaces 1c, 1c of the batteries 1, 1 at the ends of the laminated battery body 3; hence, accurate measurement of battery temperatures of these batteries 1, 1 is enabled.

When the end plates 5 and 6 are placed at the front and rear of the laminated battery body 3 as described above, for example, a plurality of elongated metal bands, which are not illustrated, are allowed to run between the end plates 5 and 6 and fixed to the metal plate 51 and the metal plate 61 through welding, thereby fixing the laminated battery body 3 in a clamped manner. Then, when appropriate connections are made between the terminals 1a and 1b of the respective batteries 1, the battery assembly is completed.

In the battery assembly having the above-described structure, the resin plates 52 and 62 are integrally fixed to the inner sides of the metal plates 51 and 61 of the end plates 5 and 6, respectively; thus, the battery holders 2 do not have to be further placed between these end plates and the batteries 1, 1 at the ends of the laminated battery body 3 in order to provide insulation therebetween as in the case where the end plates are entirely made of metal, and a reduction in the number of components to be assembled in assembling the battery assembly is enabled. Note that the resin plate of the end plate may be a single component provided as one unit as a whole like the resin plate 52 or 62, or may be divided into two or more parts. When the resin plate is divided into two or more parts, the respective parts are preferably integrally fixed to the metal plate 51 or 61. Specific examples in which the resin plate is divided into two or more parts include a method for injection-molding resin into a metal-plate-like ridged or island shape. In that case, a plurality of ridged resins or a plurality of island resins serve as the divided parts, i.e., the two or more parts of the resin plate.

Moreover, since the resin plates 52 and 62 of the end plates 5 and 6 are integrally fixed to the high-strength metal plates 51 and 61, respectively, plates each having a thickness smaller than that of the battery holder 2 are sufficiently used, thus preventing the possibility that the volume efficiency of the battery assembly will be reduced by excessive thicknesses as in the case where the end plates are entirely made of resin.

Further, since the cooling passages 4 are formed between the resin plates 52 and 62 of the end plates 5 and 6 and the batteries 1, 1 at the ends of the laminated battery body 3, efficient cooling of the batteries 1, 1 is enabled. In addition, since the protrusions 52a and 62a of the resin plates 52 and 62 are each formed into a ridged shape along the lateral direction, the cooling passages 4 are also formed linearly along the lateral direction, thus enabling efficient circulation of cooling air and further improvement in cooling efficiency.

Furthermore, the resin plates 52 and 62 hold the batteries 1, 1 at the ends of the laminated battery body 3, thus making it possible to facilitate assembly of the battery assembly and to prevent vertical and lateral positional deviation or disconnection of the batteries 1, 1 from the laminated battery body 3.

Moreover, the temperature sensors 7, 7 are embedded in the resin plates 52 and 62 of the end plates 5 and 6, thus preventing attachment of the temperature sensors 7, 7 from being obstructed by the battery holders which are placed between the end plates and the batteries 1, 1 at the ends of the laminated battery body 3 in order to provide insulation therebetween as in the case where the end plates are entirely made of metal.

Note that the case where the protrusions 52a and 62a of the resin plates 52 and 62 of the end plates 5 and 6 are provided by a large number of ridged portions extended along the lateral direction has been described in the foregoing embodiment, but the direction in which the ridged portions are extended may be freely changed in accordance with the direction of flow of cooling air. For example, the ridged portions may be extended along the vertical direction.

Further, the protrusions 52a and 62a are preferably linearly formed in order to reduce fluid resistance of cooling air and to facilitate the flow thereof through the cooling passages 4, but the protrusions 52a and 62a do not necessarily have to be linearly formed depending on the situation.

Furthermore, the protrusions 52a and 62a may only have to form the cooling passages 4, through which cooling air is circulated, between the batteries 1 and the metal plates 51 and 61; therefore, the protrusions 52a and 62a do not necessarily have to be formed by ridged portions, but may be formed by a large number of island portions, for example.

Moreover, the resin plates 52 and 62 may only have to form the cooling passages 4, through which cooling air is circulated, between the batteries 1 and the metal plates 51 and 61; hence, instead of providing the protrusions 52a and 62a, the resin plates 52 and 62 themselves may each be formed by a frame body, and the cooling passages 4 may be formed through frame gaps.

Further, the air-cooled battery assembly in which cooling air flows through the cooling passages 4 has been described in the foregoing embodiment, but the battery assembly in which the batteries 1 are cooled by the flow of a fluid such as cooling oil, for example, may be provided. Besides, the fluid may be allowed to flow naturally due to air flow or thermal convection, or may be allowed to flow forcedly by a cooling fan, a pump or the like.

Furthermore, the case where the holding portions 52b and 62b of the resin plates 52 and 62 are protruded longitudinally from the four corner portions so as to be L-shaped in cross section has been described in the foregoing embodiment, but structures of these holding portions may be freely changed as long as holding of the batteries 1 is carried out. For example, these holding portions may be eaved portions protruded longitudinally from upper and lower or right and left edges of the plate materials of the resin plates 52 and 62. Herein, "holding of the batteries" means restriction of movement of the batteries 1 in the vertical direction and lateral direction (directions perpendicular to the arrangement direction of the batteries 1) by partial engagement of the batteries 1, and therefore, the batteries 1 do not necessarily have to be fixed by this holding.

Moreover, in the foregoing embodiment, the holding portions 52b and 62b of the resin plates 52 and 62 also hold the metal plates 51 and 61, respectively, but this holding is carried out in order to simply facilitate an operation for providing fixation between the resin plates 52 and 62 and the metal plates 51 and 61; hence, the holding of the metal plates 51 and 61 by the holding portions 52b and 62b does not necessarily have to be carried out.

Further, the case where the protrusions 52a and 62a of the resin plates 52 and 62 are provided with the holes 52c and the pins 62c, respectively, has been described in the foregoing embodiment, but these holes and pins are provided in order to simply facilitate an operation for attaching the end plates 5 and 6 to the laminated battery body 3; therefore, the holes 52c and the pins 62c do not necessarily have to be provided.

Furthermore, the case where the metal plates 51 and 61 are each formed by folding the four edge portions of the rectangular metal plate material forward has been described in the foregoing embodiment; however, as long as the metal plates 51 and 61 have strength for fixing the laminated battery body 3 in a clamped manner and serve to fix the battery assembly at an installation position as necessary, these metal plates may each have any structure. For example, each of these metal plates may have a reinforcing structure, or may be provided with an attachment portion or the like for fixation of the battery assembly at an installation position.

Moreover, the case where the metal plates 51 and 61 and the resin plates 52 and 62 of the end plates 5 and 6 are integrally fixed to each other through bonding has been described in the foregoing embodiment, but a means for integrally fixing these plates may be any means. For example, the resin plates 52 and 62 may be thermally welded to the metal plates 51 and 61, respectively, or the resin plates 52 and 62 may be integrally-molded over the metal plates 51 and 61, respectively.

In addition, the case where metal bands, serving as exemplary clamp fixing means, are allowed to run between the end plates 5 and 6 and fixed through welding has been described in the foregoing embodiment, but any clamp fixing means may be used as long as the laminated battery body 3 is fixed in a clamped manner by fixation of the end plates 5 and 6.

Further, the battery holders 2 described in the foregoing embodiment may also have any structure as long as the battery holders hold the batteries 1 and form the cooling passages 4 between the batteries 1. Specifically, similarly to the resin plates 52 and 62 of the end plates 5 and 6, the protrusions 2a and the holding portions 2b may each have any structure; in particular, the protrusions 2a may have other structures as long as the cooling passages 4 are formed, and the pins 2c and the holes 2d of the holding portions 2b do not necessarily have to be provided.

Furthermore, the case where the temperature sensors 7 are used as exemplary battery state detector in order to detect the battery temperatures of the batteries 1 has been described in the foregoing embodiment, but when battery temperature detection is unnecessary or the detection is carried out by other means, the temperature sensors 7 do not have to be attached to the end plates 5 and 6.

Moreover, even when the temperature sensors 7 are attached, the temperature sensors 7 do not necessarily have to be embedded in the resin plates 52 and 62. Besides, instead of the temperature sensors 7, other battery state detector may be attached. Examples of the other battery state detector include a strain sensor and a pressure sensor for detecting swelling of the lateral surface 1c of the battery 1. The battery state detector may be formed by a plurality of types of sensors such as the temperature sensor 7 and strain sensor.

Further, although the battery 1 formed by a non-aqueous electrolyte secondary battery has been described in the foregoing embodiment, the battery may be of any type, and therefore, the battery may be other secondary battery or primary battery. Furthermore, the number of the batteries 1 used in the battery assembly is not limited to eight but may be any number.

As described above, the battery assembly according to the present invention includes: a plurality of batteries arranged in a given direction; a battery holder provided between the batteries; a pair of end plates placed outwardly of the batteries which are included in the plurality of batteries and located at ends thereof; and a clamp fixing means for fixing the plurality of batteries via the pair of end plates, wherein at least one of the pair of end plates includes: a metal plate; and an insulating plate integrally fixed to an inner side of the metal plate.

Moreover, a protrusion is formed at a surface of the insulating plate, and a tip portion of the protrusion is brought into contact with the battery at the end, thereby forming a cooling passage; furthermore, a battery state detector for detecting a state of the battery at the end is attached to at least one of the pair of end plates.

Besides, the battery state detector is fitted into the protrusion and is placed so as to be brought into contact with a surface of the battery at the end.

DESCRIPTION OF THE REFERENCE CHARACTERS 1 battery
1a positive terminal
1b negative terminal
1c lateral surface
2 battery holder
2a protrusion
2b holding portion
2c pin
2d hole
3 laminated battery body
4 cooling passage
5 end plate
51 metal plate
51a through hole
52 resin plate
52a protrusion
52b holding portion
52c hole
6 end plate
61 metal plate
61a through hole
62 resin plate
62a protrusion
62b holding portion
62c pin
7 battery state detector (temperature sensor)

The invention claimed is:

1. A battery assembly, comprising:
a plurality of batteries arranged in an arrangement direction of the batteries;
a battery holder disposed between respective batteries;
a pair of end plates disposed on an outside of batteries, which are located at both ends of the plurality of batteries; and
a clamp fixing member configured to fix the plurality of batteries via the pair of end plates,
wherein at least one of the pair of end plates comprises:
a metal plate; and
an insulating plate integrally fixed to an inner side of the metal plate,
wherein the insulating plate comprises at least one holding portion,
wherein the at least one holding portion holds, on one side of the insulating plate, a corner portion or a side edge of a battery which is located at an end in the arrangement direction of the batteries and which is fitted into the holding portion,
wherein the at least one holding portion holds, on another side of the insulating plate, the metal plate which is fitted into the holding portion,
wherein, in a first direction orthogonal to the arrangement direction of the batteries, the at least one holding portion protrudes above and overlaps a corner of a top surface of the insulating plate and a corner of a top surface of the metal plate of the at least one of the pair of end plates, and
wherein the at least one holding portion protrudes from a corner of a side surface of the insulating plate, located adjacent to the top surface of the insulating plate, in a second direction orthogonal to the arrangement direction of the batteries and to the first direction.

2. The battery assembly according to claim 1, wherein a protrusion is formed on a surface of the insulating plate, and wherein a tip portion of the protrusion is brought into contact with an end battery located at one end of the plurality of batteries so as to form a cooling passage.

3. The battery assembly according to claim 1, wherein a battery state detector configured to detect a state of an end battery is attached to the at least one of the pair of end plates.

4. The battery assembly according to claim 3, wherein a material of the battery holder has an insulating property.

5. The battery assembly according to claim 3, wherein the respective batteries comprise a battery case that comprises a metal.

6. The battery assembly according to claim 3, wherein the end battery is held by the battery holder and the insulating plate.

7. The battery assembly according to claim 3, wherein the respective batteries comprise a rectangular box type of battery case, and
wherein the respective batteries are arranged such that lateral surfaces of the battery cases of the batteries, each having the largest area, are opposed to each other.

8. The battery assembly according to claim 3, wherein the battery state detector is fitted into a protrusion.

9. The battery assembly according to claim 3, wherein the battery state detector is brought into contact with the end battery.

10. The battery assembly according to claim 3, wherein a through hole is formed through the insulating plate, and
wherein the battery state detector is fitted into the through hole.

11. The battery assembly according to claim 1, wherein the metal plate and the insulating plate are integrally fixed to each other through bonding.

12. The battery assembly according to claim 1, wherein the metal plate is held by the insulating plate.

13. The battery assembly according to claim 12, wherein a material of the battery holder has an insulating property.

14. The battery assembly according to claim 12, wherein the respective batteries comprise a battery case that comprises a metal.

15. The battery assembly according to claim 12, wherein the end battery is held by the battery holder and the insulating plate.

16. The battery assembly according to claim 12, wherein the respective batteries comprise a rectangular box type of battery case, and
   wherein the respective batteries are arranged such that lateral surfaces of the battery cases of the batteries, each having the largest area, are opposed to each other.

17. The battery assembly according to claim 1, wherein a material of the battery holder has an insulating property,
   wherein the respective batteries comprise a battery case that comprises a metal,
   wherein an end battery is held by the battery holder and the insulating plate, and
   wherein the respective batteries are arranged such that lateral surfaces of the battery cases, each having the largest area, are opposed to each other.

18. The battery assembly according to claim 1, wherein a portion of the side surface of the insulating plate abuts the at least one holding portion and another portion of the side surface of the insulating plate is exposed from the at least one holding portion to outside of the battery assembly.

19. The battery assembly according to claim 1, wherein the at least one holding portion comprises a first portion that protrudes from the corner of the top surface of the insulating plate in the first direction orthogonal to the arrangement direction of the batteries, and
   wherein the at least one holding portion further comprises a second portion that protrudes from an outer edge of the first portion of the at least one holding portion over the side surface of the insulating plate.

20. A battery assembly, comprising:
   a plurality of batteries arranged in an arrangement direction of the batteries;
   a battery holder disposed between respective batteries;
   a pair of end plates disposed on an outside of batteries, which are located at both ends of the plurality of batteries; and
   a clamp fixing member configured to fix the plurality of batteries via the pair of end plates,
   wherein at least one of the pair of end plates comprises:
      a metal plate; and
      an insulating plate disposed on an inner side of the metal plate,
   wherein the insulating plate comprises at least one holding portion,
   wherein the at least one holding portion holds, on one side of the insulating plate, a corner portion or a side edge of a battery which is located at an end in the arrangement direction of the batteries and which is fitted into the holding portion,
   wherein the at least one holding portion holds, on another side of the insulating plate, the metal plate which is fitted into the holding portion,
   wherein, in a first direction orthogonal to the arrangement direction of the batteries, the at least one holding portion protrudes above and overlaps a corner of a top surface of the insulating plate and a corner of a top surface of the metal plate of the at least one of the pair of end plates, and
   wherein the at least one holding portion protrudes from a corner of a side surface of the insulating plate, located adjacent to the top surface of the insulating plate, in a second direction orthogonal to the arrangement direction of the batteries and to the first direction.

* * * * *